US006970576B1

(12) United States Patent
Tilsley

(10) Patent No.: US 6,970,576 B1
(45) Date of Patent: Nov. 29, 2005

(54) SURVEILLANCE SYSTEM WITH AUTONOMIC CONTROL

(75) Inventor: Gwilym J Tilsley, Stevenage (GB)

(73) Assignee: MBDA UK Limited, Hertfordshire (GB)

( * ) Notice: Subject to any disclaimer, the term of this patent is extended or adjusted under 35 U.S.C. 154(b) by 209 days.

(21) Appl. No.: 09/622,810

(22) PCT Filed: Jul. 19, 2000

(86) PCT No.: PCT/GB00/02776

§ 371 (c)(1),
(2), (4) Date: Aug. 23, 2000

(87) PCT Pub. No.: WO01/11581

PCT Pub. Date: Feb. 15, 2001

(30) Foreign Application Priority Data

Aug. 4, 1999 (GB) .................................. 9918248

(51) Int. Cl.[7] .......................... G06K 9/00; H04N 7/18; H04N 9/47
(52) U.S. Cl. ..................... 382/103; 348/143; 348/152; 348/153
(58) Field of Search ................. 348/150, 152–153, 348/143, 187; 382/103, 104, 107; 396/153

(56) References Cited

U.S. PATENT DOCUMENTS

| 4,740,839 | A | * | 4/1988 | Phillips | 348/156 |
| 5,091,780 | A | | 2/1992 | Pomerleau | 348/152 |
| 5,491,511 | A | * | 2/1996 | Odle | 348/153 |
| 5,517,236 | A | * | 5/1996 | Sergeant et al. | 348/143 |
| 5,666,157 | A | | 9/1997 | Aviv | 348/152 |
| 5,930,405 | A | | 7/1999 | Chida | 382/284 |
| 5,969,755 | A | * | 10/1999 | Courtney | 348/143 |
| 2002/0015094 | A1 | | 2/2002 | Kuwano | 348/143 |

FOREIGN PATENT DOCUMENTS

| CA | 2230428 | 2/1998 |
| FR | 2 704 818 | 11/1994 |
| JP | 01-138873 | 5/1989 |
| JP | 5-334572 | 12/1993 |
| JP | 05-334572 | 12/1993 |
| JP | 6-223277 | 8/1994 |
| JP | 06-223277 | 8/1994 |
| JP | 06-225197 | 8/1994 |
| JP | 06225197 A | 8/1994 |
| JP | 10-336632 | 12/1998 |
| JP | 11-103457 | 4/1999 |
| WO | WO 93/19441 | 9/1993 |
| WO | 95/29470 A1 | 11/1995 |
| WO | 97/42764 A1 | 11/1997 |
| WO | 98/19450 A2 | 5/1998 |
| WO | 99 05867 | 2/1999 |

* cited by examiner

Primary Examiner—Bhavesh M. Mehta
Assistant Examiner—Shefali Patel
(74) Attorney, Agent, or Firm—Nixon & Vanderhye P.C.

(57) ABSTRACT

A surveillance system which allows an operator to determine the type of objects or events which trigger image capture and analysis. Analysis of captured images is provided by access to various type of databases thereby providing for positive identification and monitoring of objects or events, and further provided for the system to issue control commands or prompt operations if required.

16 Claims, 2 Drawing Sheets

SURVEILLANCE SYSTEM WITH AUTONOMIC CONTROL

This application is the US national phase of international application PCT/GB00/02776, filed in English on 19, Jul. 2000 which designated the US. PCT/GB00/02776 claims priority to GB Application No. 9918248.7 filed 4, Aug. 1999. The entire contents of these applications are incorporated herein by reference.

This invention relates to the field of surveillance, and more specifically, but not exclusively to surveillance based systems which utilize intelligence of knowledge based systems to support their operation.

Improvements in the art of closed circuit image acquisition cameras have provided for a marked increase in the use of remote cameras for applications such as shop and public area security and more evidently traffic monitoring and law enforcement.

Typically, the type of camera systems utilised for shop and public area security fall into two main categories, namely the fixed field of view, fixed focus real time recorded video system, and the more labour intensive human operated system, usually comprising an operator directable and focusable camera assembly.

Law enforcement applications for camera systems typically comprise either a similar type operator based system as described above for traffic monitoring, or fixed position speed cameras, which utilize a radar based object speed detection sensor and timing unit to capture images against fixed references to allow for subsequent human analysis for the purpose of court evidence. Increasingly the use of digital camera technology is providing for more sophisticated vehicle speed analysis cameras, but typically such systems are mobile and require a human operator.

In an attempt to provide the police with greater information about the movement of vehicles around the UK road system, tracking systems have been proposed which utilize camera systems that effectively capture and analyse images of passing car registration plates. The information captured is relayed to a central unit, the information then being searchable so as to allow the selective identification of a known vehicle's movements.

One common problem encountered in the art is that of the amount of data which is required to be stored to enable meaningful post analysis of the captured scene. Data compression techniques have been applied such as the storing of only every fourth video image frame, but this leads to the step animated appearance of some surveillance system image playback.

A further problem associated with surveillance systems is the quality of images and information discernible from such images that are captured and stored. The requirement to have a field of view camera or other imaging means sufficient to cover a whole scene usually dictates the use of low resolution, wide-angle equipment. Evidence of the poor quality images usually associated with surveillance systems can be illustrated by the footage produced from security systems such as those used in high street banks and petrol stations. Often the facial features of criminals are difficult to identify using the results of such systems, even when the criminal is captured facing directly at a camera.

Our invention provides for surveillance and monitoring system which comprises the ability to combine state of the image capture technology and real time scene and image analysis, with an intelligent, knowledge based system. This results in a surveillance system which requires minimum operator intervention to provide an intelligent assessment of captured real time events, and further provides for the ability to prompt an operator or initiate certain control functions on the witnessing of some pre-determined event or series of events.

Accordingly there is a surveillance system comprising imaging means, said imaging means being positioned so as to have a field of view of an area over which surveillance is required, image processing means, said image processing means being programmable such that an operator can pre-determine the events which activate use of image analysis means, image analysis means, said image analysis means utilising processing means to determine suitable control function responses to events viewed by said imaging means, and system control means, said system control means providing general control functions to said imaging means, scene processing means and scene analysis means.

In a preferred embodiment of said invention, said imaging means may comprise at least one first imaging means and at least one second imaging means, said second imaging means having the ability to provide more detailed information in relation to a partial section of the view of said first imaging means.

In another preferred embodiment of said invention, a plurality of said surveillance systems are so positioned in relation to an area which is to be subject to surveillance, such that the combination of the fields of view of said imaging systems provides for the ability to follow the progress of event moving or developing within the field of view of the plurality of said imaging means, thereby providing for a target tracking ability, allowing event analysis to be conducted over an increased time.

In a further embodiment of the invention said first and second imaging means are movable either in response to commands from a central system control means, or in response to operator issued commands.

In yet a further embodiment of the invention, said image analysis means comprises an artificial intelligence (AI) means, said AI means providing for increased selectivity in the choosing of target objects and patterns of events, thereby further reducing the level of data storage or compression required for operation of said surveillance system.

Embodiments of the invention will now be described by way of example only with reference to the following figures.

Figure 1:
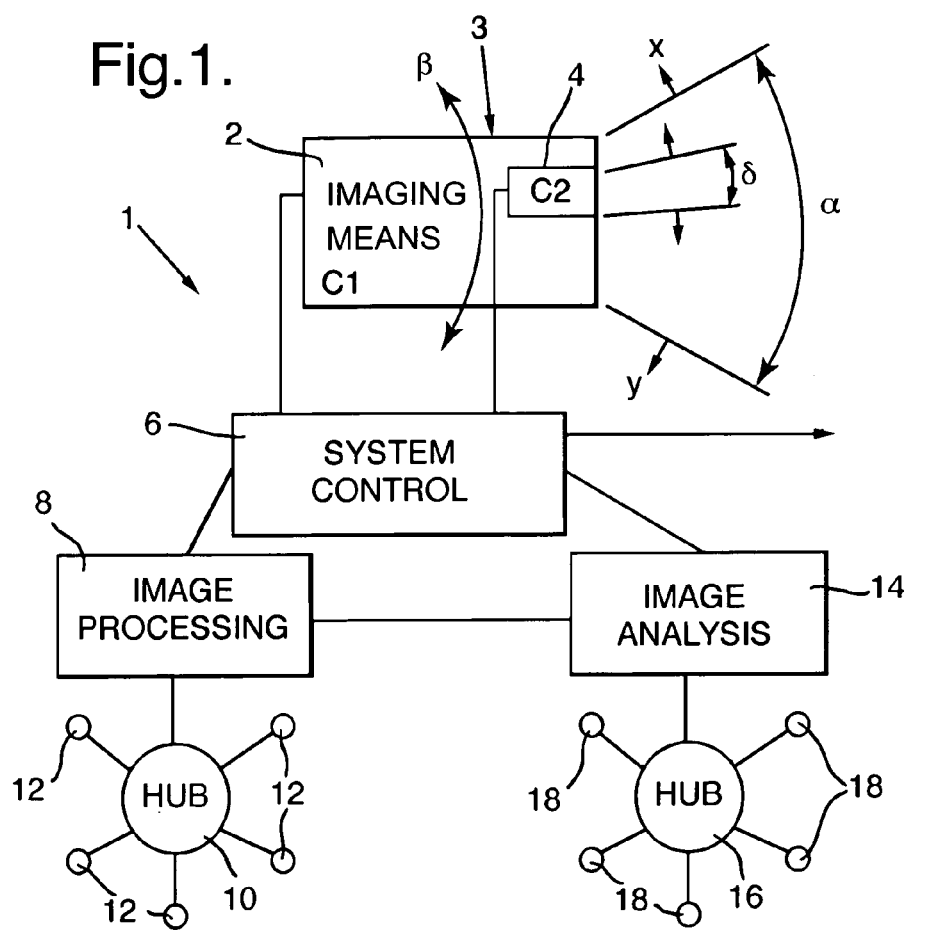
FIG. 1 is a schematic representation of a surveillance system in accordance with the invention.

FIG. 1 shows a surveillance system 1 in accordance with the invention in which an imaging means 3 comprises two charged couple device (CCD) cameras 2 (C1) & 4 (C2). Camera 2 comprises a wide to normal field of view ($\alpha$) low to normal resolution CCD camera, whereas in comparison to camera 2, camera 4 comprises a narrow field of view ($\delta$), higher resolution camera. Camera 4 may further comprise a zoom facility and may or may not be aligned to the boresight of camera 2. Cameras 2 and 4 may also be provided with dependent or independent controllable movement and rotation about a range of axes ($\beta$) to further facilitate the possibility of acquiring an image for analysis.

Additionally cameras 2 and 4 may comprise, but are not limited to, discrete camera systems, multiple lenses or multiple mirror systems or adaptive optics systems, which may be co-located, widely spaced or be part of a multiple camera application.

The outputs of cameras 2 and 4 are fed to the image processing means 8 via a system control means 6. The image processing means 8 provides the first level of image analysis by processing the images captured by said camera 2 and determining whether further analysis of the image is required by reference to at least one database means 12. The image processing means will have been pre-programmed to be triggered into requesting further analysis of an image or images on witnessing certain pre-determined events, features or sequences of actions or images. The pre-determination of these events etc may require the use of and access to a range of data-base means, possibly via a hub means 10, including, but not limited to, human operators, Rule Based Systems (RBS), Knowledge Based Systems (KBS), Artificial Intelligence Systems (AI), Data-Bases, Algorithms and the like.

Examples of images or events which may form the basis of a pre-programmed trigger to request further analysis include the speed, dimensions, temperature, luminescence, time, frequency of passing, conformity or abnormality of human beings, animals, vehicles or other defined objects.

Additionally the image processing means may make a qualitative assessment of the image provided by camera 2, and should the threshold quality of the image not be provided by camera 2, then the image processing means will request from the system control means 6 that the second camera 4 be used so as to provide higher quality images for passing to the image analysis means 14. The assessment of the adequacy of the image to ensure sufficient characteristics have been captured will ensure the increase in certainty of recognition required for evidence purposes in criminal prosecutions.

Additionally the image analysis could be utilised to monitor patterns of behaviour of individuals or groups of individuals for the purposes of marketing and/or sales or customer/product intelligence.

The image analysis means 14 provides the surveillance system 1 with the ability to make a detailed analysis of the content of images supplied by cameras 2 and 4, such analysis being provided by access to a range of data-base means 18, in a similar fashion to that described above in connection with said image processing means. The image analysis means 14 is shown having a hub connection 16 to a range of data-base sources 18, which may include, but are not limited to human operators, RBS, KBS, AI, Data-bases and Algorithms and the like. The various database means available to the image analysis means may or may not include those database means accessible by the image processing means.

The image analysis means will have the ability to demand further image information, such information comprising higher or lower resolution images from cameras 2 and 4 or wider angle images (x, y) along with use of additional imaging means such as, but not limited to, conventional radar, synthetic aperture radar (SAR), infra-red imaging systems (visible and non-visible), milimetric wave imaging systems, acoustic and magnetic systems.

Operator defined criteria will define the images which will be selected for image analysis 14. The nature and extent of the image analysis conducted will depend on the functionality of the particular surveillance system and it's constitute components. Examples of the extent of image analysis include the facial identification of human beings, with possible cross references to databases of known criminals, suspects or other persons whose whereabouts is required to be established, car registration analysis, with cross references to details such as vehicle colour, speed, location, occupants, frequency of passing a known location, or time spent within a particular catchment area.

The image analysis function of the surveillance system is designed to include an element of 'self-learning' or AI which will provide for the establishment of pattern or behavioural analysis. Such analysis will provide for an effective filter mechanism to eliminate from further analysis activities or patterns of behaviour which it has been previously established are not worthy of further analysis, for example, the same car seen every Wednesday at 5:00 pm, to 5:30 pm, the same two men enter the building society carrying bags every Friday, a person of the same dimensions passes wearing a crash helmet every day.

The use of the image analysis means 14 combined with the other elements of the system will enable the identification of discrete features or known patterns of behaviour which differ from the established norm, or may warrant surveillance on the basis of matching with the identification of a particular person, object or combination thereof.

The system control means 6 provides the surveillance system 1 with control functions required to administer the operation of the system as a whole, and may include, but are not limited to self diagnostic functions (image quality, system functionality, communications integrity etc), alarm functions relating to unlawful interference with the system and control of the imaging means by functions such as managing requests from the image processing means to switch or alter characteristics or functions of the imaging means (i.e. direction, focus, lens, resolution, type of camera etc). Additionally the system control means may control and/or manage the communications links to the various external bodies, databases, establishments or persons required by the type of operation to which the system is being put to use.

Figure 2:
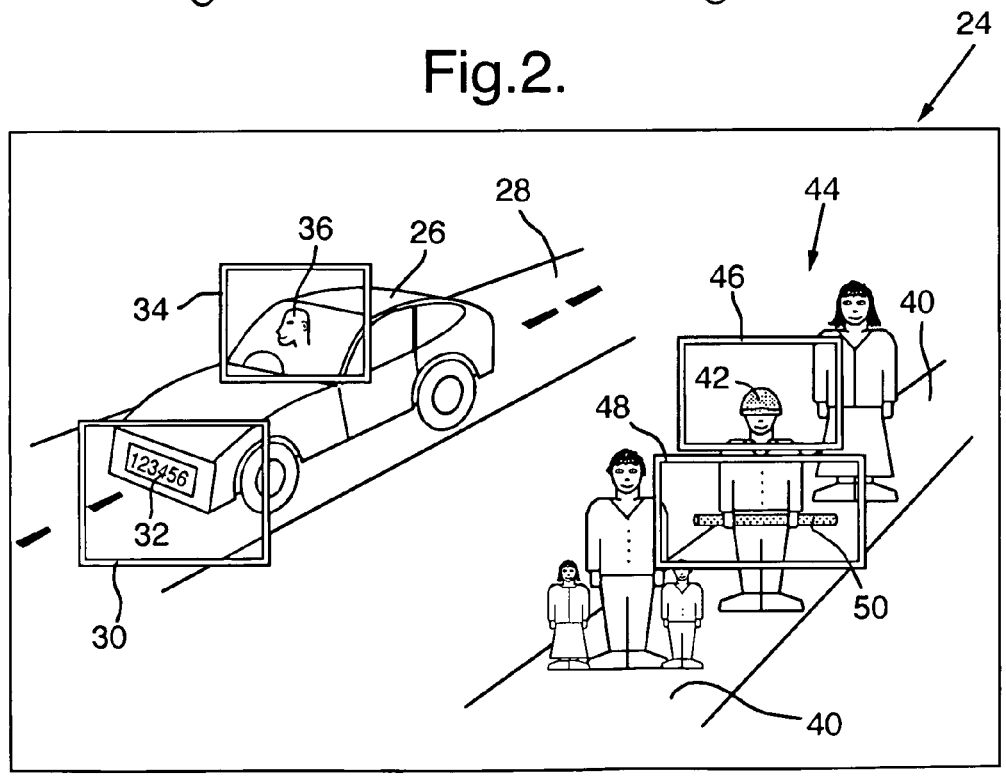
FIG. 2 is a diagrammatic representation of a scene captured by said first and said second cameras.

FIG. 2 shows an example of a scene as may be viewed by an imaging system 2 & 4 as described above. The extent of the viewable image is shown 24, the view comprising a section of highway 28 and an area of public walkway 40. A car 26 is shown passing through the scene 24, and in this example of a surveillance system in accordance with the invention, a trigger has been pre-programmed within the image processing means 8 such that when a car passes through the scene 24, the image analysis means 14 is activated and certain information is sought for further analysis.

In the car 26 passing through the scene 24, the image analysis means would typically be programmed so as to try and acquire positive identification of the numerals displayed on the vehicle registration plate 32. Should the image supplied by the camera 2 not provide sufficient clarity of contain sufficient information for such data to be acquired, then the image processor means will request, via the system control means, that a higher resolution camera means 4 is used, giving more detailed information relating to one area of the scene 24. In this example, frame 30 shows a representative fields of view for camera 4, the information contained therein being sufficient for the image analysis means 14 to make a positive identification of the vehicle registration plate. Once the image has been acquired, the image analysis means 14 can connect via the hub 16 to a database of known vehicle registrations, and if required can store or supply information relating to the said vehicle to another database or to any other type of display of data storage means. Additionally, other databases may be interrogated so as to provide further identification features such as the cross matching of the vehicle colour to that on the registration details, cross referencing the registration to vehicles reported stolen or the owners of which are required for questioning by the police or insurance companies, along with other possible checks such as vehicle speed, frequency of passing a certain location and elapsed time spent within a certain vicinity.

The system can further utilised for example to acquire images of vehicle occupants. Frame 34 depicts the field of view of camera 4, giving a view of the occupant 36 of the vehicle 26. The image can then be interrogated by reference to a facial identification database (i.e. 18), which again may be further interfaced to additional databases and/or RBS, KBS and AI systems to enable the identification and knowledge of the movements and type of transport used by specific persons or groups of persons.

FIG. 2 also depicts a view taken from an imaging means 2 showing a group of people 44 walking along a pathway 40. One of the pre-determined triggers for the image processing means 8 could be the recognition of 'human shaped objects' 44. The image analysis means would then be tasked with identifying the face of the human being by applying the use of camera 4 and frame 46. In the event that the face of the human could not be identified due to obscuration by means such as a hat 42 or balaclava (not shown), the image analysis means would record a failure to identify a target and depending on the nature and extent of the rules governing the database means may either raise an alarm to an operator, or begin a further sequence of analysis to try and further identify characteristics of the subject. Such further analysis could extend to identifying objects 50 carried by the subject, and by applying the use of higher resolution camera means 4, using field of view frame 48, the image analysis means will attempt to identify the object 50 by reference to a list of known threats, i.e. firearms, truncheons, knives etc. Depending on the result of the analysis, images may be stored and/or operator alarms maybe activated or other control functions initiated such as alarms, door closures, lighting increased and the like.

Figure 3:
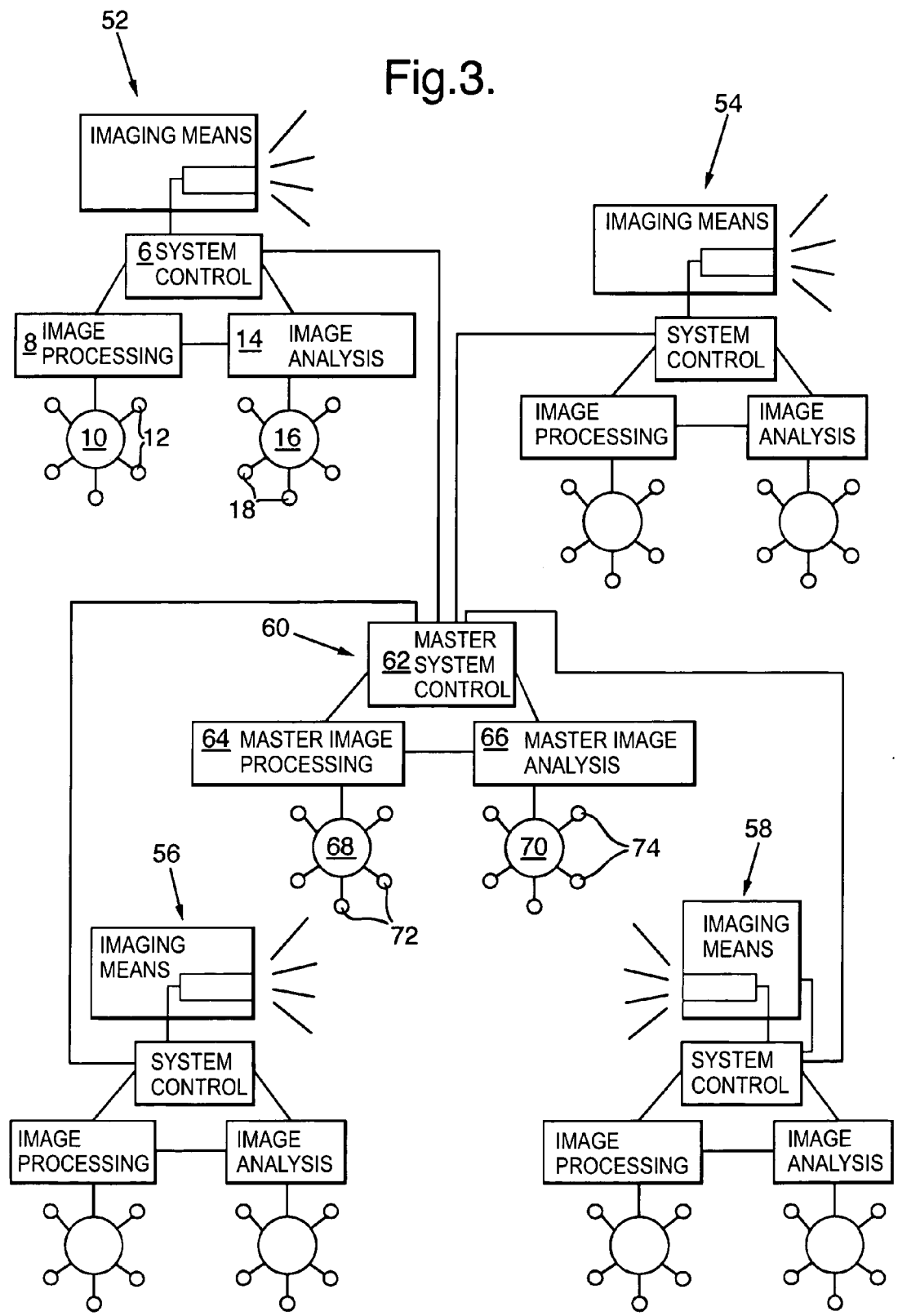
FIG. 3 is a diagrammatic representation of a network of cameras in accordance with the invention.

FIG. 3 shows a network of surveillance systems 52, 54, 56, 58, in accordance with the invention. Each of said individual surveillance systems 52, 54, 56, 58 can operate in accordance with the system described in FIG. 1, each having imaging means 2, 4, system control means 6, image processing means 8, image analysis means 14, hub means 10, 16 and database means 12, 18. Additionally there is provided a master system control means 62, master image processing means 64, master image analysis means 66, and corresponding hub means 68, 70 and database means 72, 74. The master elements of the system 62, 64, 66 as depicted in FIG. 3, enable the surveillance system as a whole to be centrally managed or controlled to enable more sophisticated surveillance tasks to be undertaken. A typical connectivity is illustrated between the elements of the networked system, but various combinations or interface means may be provided between said elements such as databus technology, digital or analogue cable or terrestrial transmissions or satellite communications.

Utilising the invention in the embodiment shown at FIG. 3, if imaging means 3 comprising a camera acquires an image which is passed by the image processing means 8 to the image analysis means 14, then should said image move out of view of the system 52, then via the master system control means 62, the imaging means of system 54 can be employed to continue the surveillance and analysis as required. This 'hand-over' between the individual elements of the networked system provides for a far greater area coverage than the individual system, and additionally provides for ensuring the continuity of surveillance required for evidence in criminal prosecutions.

Alternatively, in an embodiment not illustrated, the surveillance system may be provided with a system control means and/or a master system control means which is provided with a plurality of imaging means connected to directly to said master or system control means, thereby providing for the centralising of the control functions of the system, and the probable reduction in the number of image processing and image analysis means required to perform the surveillance operation.

The imaging means 3 provided for use with the system may be mobile, or connected or installed on a mobile platform or vehicle.

The system as a whole may itself be self contained such that references to databases should be interpreted as references to algorithms contained in or accessible by the system. Such self contained systems may make use of mobile or fixed cameras but be self contained in the sense of no communications to databases outside of the system.

What is claimed is:

1. A surveillance system comprising:
   (a) a first camera, positioned to have a field of view of a surveillance area, for providing images of said surveillance area,
   (b) a second camera for providing a higher quality image of at least a portion of the surveillance area,
   (c) an image processing means for making a qualitative assessment of the images provided by said first camera and for causing, when the image quality is inadequate, operation of said second camera to provide a higher quality image of said portion of the surveillance area requiring further analysis,
   (d) a data-base comprising at least one data-base source from the group comprising human operators, rule based systems, knowledge based systems, artificial intelligence systems, data-bases and algorithms, and
   (e) an image analysis means for
      analyzing the content of said higher quality images from said second camera with reference to said data-base,
      assessing whether any further analysis of the content of said higher quality images from said second camera is required, and
      controlling said second camera to provide further image information of any portion of said surveillance area requiring further analysis.

2. A surveillance system, as in claim 1, wherein said image analysis means further includes means for:
   analyzing the content of said images from said first camera with reference to said data-base,
   assessing whether any further analysis of the content of said images from said first camera is required, and
   controlling at least one of said cameras to provide further image information of any part of said surveillance area requiring further analysis.

3. A surveillance system, as in claim 1, wherein said image processing means is pre-programmed to request further analysis of any image having a feature taken from the group comprising certain pre-determined events, features, sequences of actions and images.

4. A surveillance system, as in claim 3, wherein said image processing means is pre-programmed by said data-base.

5. A surveillance system, as in claim 3, wherein said image analysis means is pre-programmed to determine a control function response to any image having one of said features.

6. A surveillance system, as in claim 1, wherein said image analysis means includes a self-learning means for identifying at least one of a pattern of events and pattern of behavior in a previous sequence of said images that has already been analyzed and regarded as unimportant, and for eliminating said unimportant at least one pattern of events and pattern of behavior from further analysis by said image analysis means.

7. A surveillance system, as in claim 1, wherein said image analysis means includes an artificial intelligence means for identifying one of a pattern of events and pattern of behavior in a previous sequence of said images that has already been analyzed and regarded as unimportant, and for eliminating said unimportant at least one pattern of events and pattern of behavior from further analysis by said image analysis means.

8. A surveillance network comprising a plurality of surveillance systems, as in claim 1, with each of said first cameras positioned to have a field of view of a portion of a combined surveillance area whereby each of said first cameras provides images of said combined surveillance area, each of said second cameras provides more detailed images of at least a portion of said combined surveillance area thereby enabling an object to be monitored and tracked continuously within said combined surveillance area, and a control means for handing over tracking of said object from one of said cameras covering one portion of said combined surveillance area to another of said cameras covering an adjoining portion of said combined surveillance area thereby ensuring continuity in the surveillance of said object.

9. A surveillance system, comprising:
(a) a first camera, positioned to have a field of view of a surveillance area, for providing images of said surveillance area,
(b) a second camera for providing a higher quality image of at least a portion of the surveillance area,
(c) an image processing means for making a qualitative assessment of the images provided by said first camera and for causing, when the image quality is inadequate, operation of said second camera to provide a higher quality image of said portion of the surveillance area requiring further analysis,
(d) a data-base comprising at least one data-base source from the group comprising human operators, rule based systems, knowledge based systems, artificial intelligence systems, data-bases and algorithms,
(e) at least one additional imaging means from the group comprising conventional radar, synthetic aperture radar, infra-red imaging systems, milimetric wave imaging systems, acoustic systems and magnetic systems, and
(f) an image analysis means for
analyzing the content of said higher quality images from said second camera with reference to said data-base,
assessing whether any further analysis of the content of said higher quality images from said second camera is required,
controlling said second camera to provide further image information of any portion of said surveillance area requiring further analysis, and
demanding further image information from said additional imaging means.

10. A surveillance system comprising:
(a) a first imaging means positioned to have a field of view of a surveillance area, for providing images of said surveillance area,
(b) at least one second imaging means having the ability to provide more detailed information in relation to at least a portion of said surveillance area,
(c) an image processing means for making a qualitative assessment of the images provided by the first imaging means and for causing, when the image is inadequate, operation of said second imaging means to provide more detailed information of said portion of the surveillance area,
(d) a data-base comprising at least one data-base source from the group comprising human operators, rule based systems, knowledge based systems, artificial intelligence systems, data-bases and algorithms, and
(e) an image analysis means for:
analyzing the content of said more detailed information with reference to said data-base,
assessing whether any further analysis of the content of said more detailed information from said second imaging means is required, and
controlling said second imaging means to provide further information of any portion of said surveillance area requiring further analysis.

11. A surveillance system, as in claim 10, wherein said second imaging means is selected from the group comprising conventional radar, synthetic aperture radar, infra-red imaging systems, millimetric way imaging systems, acoustic systems, magnetic systems and cameras providing a higher quality image.

12. A vehicle surveillance system comprising:
(a) a first camera positioned to view a passing vehicle and to produce an image thereof,
(b) a second camera operable to produce a more detailed image of said passing vehicle,
(c) an image processing means for making a qualitative assessment of said vehicle image provided by the first camera and for causing, when an image from the first camera is inadequate, operation of the second camera to provide a more detailed image of at least part of the vehicle,
(d) a data-base comprising at least one data-base source from the group comprising human operators, rule based systems, knowledge-based systems, artificial intelligence systems, data-bases and algorithms, and
(e) an image analysis means for;
analyzing the content of said more detailed vehicle image with reference to said data-base,
assessing whether any further analysis of said more detailed vehicle image is required, and
controlling at least one of said cameras to provide a further image of at least part of the vehicle.

13. A vehicle surveillance system comprising:
(a) a first camera positioned to view passing vehicles and to produce images thereof,
(b) an imaging means operable to produce a more detailed image of any part of a passing vehicle, said imaging means being selected from the group comprising conventional radar, synthetic aperture radar, infra-red imaging systems, millimetric way imaging systems, acoustic systems, magnetic systems and cameras producing a high quality image,
(c) an image processing means for making a qualitative assessment of said vehicle images provided by said first camera and for causing, when an image from the first camera is inadequate, operation of said imaging means to provide a more detailed image of at least part of the vehicle, (d) a data-base comprising at least one data-base source from the group comprising human operators, rule based systems, knowledge based systems, artificial intelligence systems, data-bases and algorithms, and (e) an image analysis means for analyzing the content of said more detailed image with reference to said data-base.

14. A vehicle surveillance system, as in claim 13, wherein said image analysis means is arranged to analyze the content of said more detailed image to identify at least one feature from the group comprising vehicle color, vehicle registration, vehicle speed, and image of its driver.

15. A vehicle surveillance system, as in claim 13, wherein said image analysis means is also arranged for:

assessing whether any further identification features of the vehicle are required, and controlling said imaging means to capture such further identification features of the said vehicle.

16. A vehicle surveillance system, as in claim 13, wherein said image analysis means is arranged to assess whether at least one required feature from the group comprising vehicle color, vehicle registration, vehicle speed and image of its driver has been identified, and controlling said imaging means to identify said required feature.

* * * * *